United States Patent
Mahanta et al.

(10) Patent No.: US 10,868,673 B2
(45) Date of Patent: Dec. 15, 2020

(54) NETWORK ACCESS CONTROL BASED ON DISTRIBUTED LEDGER

(71) Applicant: SAP SE, Walldorf (DE)

(72) Inventors: Prabal Mahanta, Lucknow (IN); Bhavneet Kaur, Ludhiana (IN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 15/714,041

(22) Filed: Sep. 25, 2017

(65) Prior Publication Data

US 2019/0097807 A1   Mar. 28, 2019

(51) Int. Cl.
*H04L 29/06* (2006.01)
*H04L 9/32* (2006.01)
*H04L 9/06* (2006.01)
*G06Q 20/38* (2012.01)

(52) U.S. Cl.
CPC .......... *H04L 9/3239* (2013.01); *H04L 9/0637* (2013.01); *H04L 63/10* (2013.01); *H04L 2209/38* (2013.01)

(58) Field of Classification Search
CPC . H04L 2209/38; H04L 9/0637; H04L 9/3236; H04L 9/3239; H04L 63/10; G06F 21/64; G06F 16/1805
See application file for complete search history.

(56) References Cited

U.S. PATENT DOCUMENTS

| | | | | |
|---|---|---|---|---|
| 9,824,031 B1 * | 11/2017 | Ganti | | G06F 21/00 |
| 9,875,510 B1 * | 1/2018 | Kasper | | G06Q 40/12 |
| 9,935,772 B1 * | 4/2018 | Madisetti | | H04L 9/0819 |
| 10,050,955 B2 | 8/2018 | Zollinger et al. | | |
| 2015/0363782 A1 * | 12/2015 | Ronca | | G06Q 20/4016 705/75 |
| 2016/0224949 A1 * | 8/2016 | Thomas | | G06Q 20/027 |
| 2016/0261685 A1 * | 9/2016 | Chen | | H04L 67/104 |
| 2017/0091397 A1 * | 3/2017 | Shah | | H04L 9/3236 |
| 2017/0140408 A1 * | 5/2017 | Wuehler | | G06Q 30/0207 |
| 2017/0214699 A1 * | 7/2017 | Johnsrud | | H04L 63/126 |

(Continued)

OTHER PUBLICATIONS

Poon, Joseph, and Vitalik Buterin. "Plasma: Scalable autonomous smart contracts." White paper (2017): 1-47. (Year: 2017).*

(Continued)

*Primary Examiner* — Michael Simitoski
(74) *Attorney, Agent, or Firm* — Schwegman Lundberg & Woessner, P.A.

(57) ABSTRACT

Example embodiments for controlling access in a network system based on a distributed ledger are presented. In an example embodiment, a plurality of nodes of a computer network capture information describing requested data transactions in the computer network. At least some of the nodes construct transaction blocks for a distributed ledger, with each of the transaction blocks including information describing one or more of the requested data transactions. The nodes publish the transaction blocks to other nodes. The nodes receiving the transaction blocks add those of the transaction blocks that do not include a disallowable requested data transaction to copies of the distributed ledger. One or more arbitrator nodes approve those of the requested data transactions represented in transaction blocks added to the copies of the distributed ledger by a consensus of the nodes.

20 Claims, 9 Drawing Sheets

(56) References Cited

U.S. PATENT DOCUMENTS

| | | | | |
|---|---|---|---|---|
| 2017/0228734 | A1* | 8/2017 | Kurian | G06Q 10/105 |
| 2017/0236120 | A1* | 8/2017 | Herlihy | G06Q 20/3827 |
| | | | | 705/67 |
| 2017/0237554 | A1* | 8/2017 | Jacobs | H04L 9/0819 |
| | | | | 713/171 |
| 2017/0244707 | A1* | 8/2017 | Johnsrud | H04L 63/08 |
| 2017/0270527 | A1* | 9/2017 | Rampton | G06Q 20/4016 |
| 2017/0279818 | A1* | 9/2017 | Milazzo | H04L 63/1416 |
| 2017/0287593 | A1* | 10/2017 | Ovalle | G07F 17/329 |
| 2017/0289134 | A1* | 10/2017 | Bradley | H04L 63/102 |
| 2017/0300627 | A1* | 10/2017 | Giordano | G16H 10/60 |
| 2017/0317997 | A1* | 11/2017 | Smith | H04L 9/0861 |
| 2017/0323392 | A1* | 11/2017 | Kasper | G06Q 40/12 |
| 2018/0075527 | A1* | 3/2018 | Nagla | G06F 21/6218 |
| 2018/0096752 | A1* | 4/2018 | Ovalle | G06Q 50/34 |
| 2018/0101560 | A1* | 4/2018 | Christidis | G06F 16/215 |
| 2018/0114403 | A1* | 4/2018 | Jayachandran | G07F 17/3244 |
| 2018/0121909 | A1* | 5/2018 | Christidis | G06Q 20/383 |
| 2018/0189732 | A1* | 7/2018 | Kozloski | G06Q 10/101 |
| 2018/0212970 | A1* | 7/2018 | Chen | H04L 63/062 |
| 2018/0248880 | A1* | 8/2018 | Sardesai | H04L 63/101 |
| 2018/0302215 | A1* | 10/2018 | Salgueiro | H04L 65/1083 |
| 2018/0308134 | A1* | 10/2018 | Manning | G06Q 30/02 |
| 2018/0337769 | A1* | 11/2018 | Gleichauf | G06Q 20/29 |
| 2018/0337771 | A1* | 11/2018 | Baker | G06F 21/575 |
| 2018/0341930 | A1* | 11/2018 | Moir | G06Q 20/0655 |
| 2019/0020661 | A1* | 1/2019 | Zhang | H04L 9/0637 |
| 2019/0034892 | A1* | 1/2019 | Smith | H04L 9/3239 |
| 2019/0036702 | A1* | 1/2019 | Kano | G06F 16/182 |
| 2019/0036914 | A1 | 1/2019 | Tzur-david et al. | |
| 2019/0050431 | A1* | 2/2019 | Callan | H04L 9/3239 |
| 2019/0068562 | A1 | 2/2019 | Iyer et al. | |
| 2019/0087893 | A1* | 3/2019 | Pellew | H04L 9/3247 |
| 2019/0122186 | A1* | 4/2019 | Kano | G06F 21/64 |
| 2020/0067697 | A1 | 2/2020 | Puddu et al. | |
| 2020/0084018 | A1 | 3/2020 | Pande et al. | |

OTHER PUBLICATIONS

Maesa, Damiano Di Francesco, Paolo Mori, and Laura Ricci. "Blockchain based access control." IFIP International Conference on Distributed Applications and Interoperable Systems. Springer, Cham, 2017. (Year: 2017).*

Xu, Lei, et al. "DI-bac: Distributed ledger based access control for web applications." Proceedings of the 26th International Conference on World Wide Web Companion. 2017. (Year: 2017).*

"U.S. Appl. No. 16/124,732, Non Final Office Action dated Jun. 1, 2020", 28 pgs.

Jansen, Marc, "About a Decentralized 2FA Mechanism", ICIW: The Twelfth International Conference on Internet and Web Applications and Services, (2017), 44-47.

"U.S. Appl. No. 16/124,732, Response filed Sep. 1, 2020 to Non Final Office Action dated Jun. 1, 2020", 16 pgs.

* cited by examiner

US 10,868,673 B2

NETWORK ACCESS CONTROL BASED ON DISTRIBUTED LEDGER

FIELD

The present application relates generally to data processing and, more specifically in an example embodiment, to a network access control scheme employing distributed ledger technology.

BACKGROUND

Cloud computing systems provide users with one or more services (e.g., Software-as-a-Service (SaaS), data storage, and the like) via a communication network, such as the Internet. Generally, a cloud service provider provides one or more virtual machines (VMs) executing on physical servers, with the VMs executing applications (e.g., data processing applications, database applications, etc.) accessible by the users. Cloud systems are popular for several reasons, such as the ability of the user to scale the amount of computing resources (e.g., processors, memory, and so on) and associated costs quickly over time to meet changing demands, the reduction in user expenditures on computing hardware and associated labor, and so on.

However, in at least some cases, while most cloud service providers implement the highest security standards currently available, data stored or processed in the cloud that belongs to the users may still be exposed to at least some security risks. For example, malware may still infect VMs, thus negatively affecting the applications executing thereon, as well as the user data being processed and stored using those applications.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
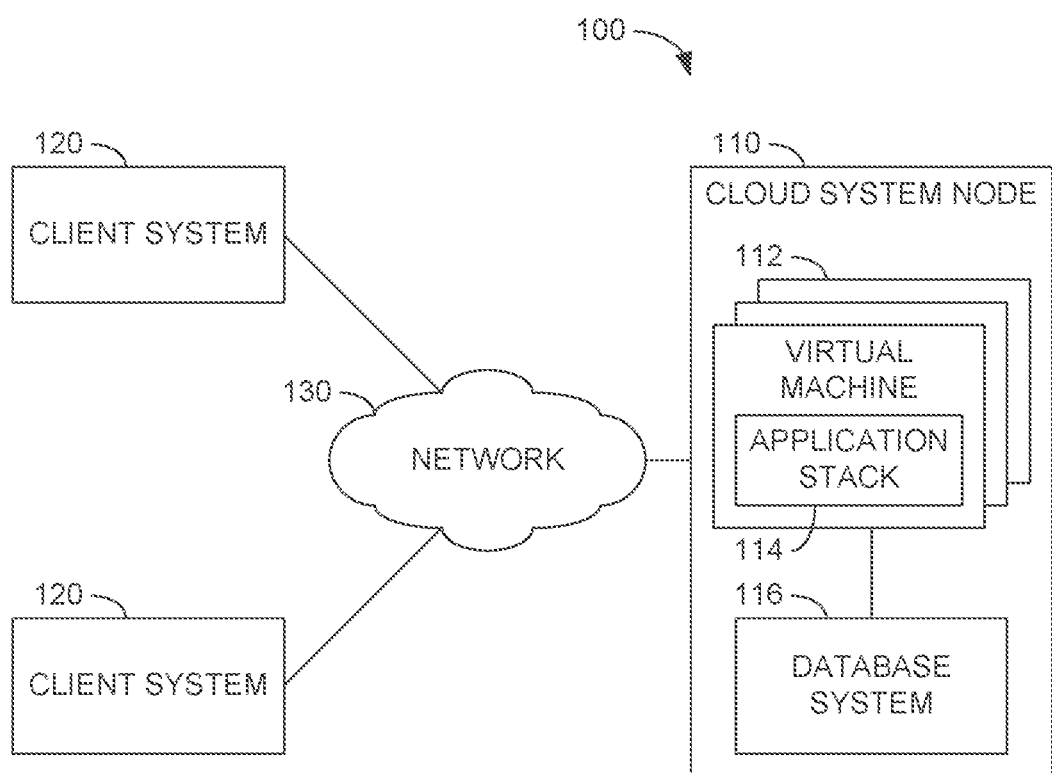
FIG. 1 is a block diagram of an example node of a cloud-based system accessed by multiple client systems.

FIG. 1 is a block diagram of an example node 110 of a cloud-based system 100 accessed by multiple client systems 120. Each client system 120 may access the node 110 (e.g., an application server) to employ one or more application stacks 114, each of which may execute on a virtual machine (VM) 112, with multiple such VMs 112 operating on a single hardware computing system. In addition, the applications of the application stack 114 executing on a VM 112 may access data stored in one or more database systems 116. In an example embodiment, the applications of a particular application stack 114 may operate in combination to perform one or more particular tasks (e.g., data processing, data organization, etc.) initiated by the client system 120. In some example embodiments, the node 110 may provide the application stacks 114 as part of a Software-as-a-Service (SaaS) offering, such as for an enterprise resource planning (ERP) system. However, other types of cloud services and systems may implement the various example embodiments described herein. Further, while a single node 110 is depicted in the cloud system 100 in FIG. 1, multiple such nodes 110 may be employed in the cloud system 100 in many example embodiments, as described below.

In example embodiments, each client system 120 may be a desktop computer, laptop computer, tablet computer, smart phone, or other computing or communication device. The client systems 120 may communicate with the nodes 110 of the cloud system 100 via a communication network 130. In example embodiments, the communication network 130 may be a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof.

Figure 2:
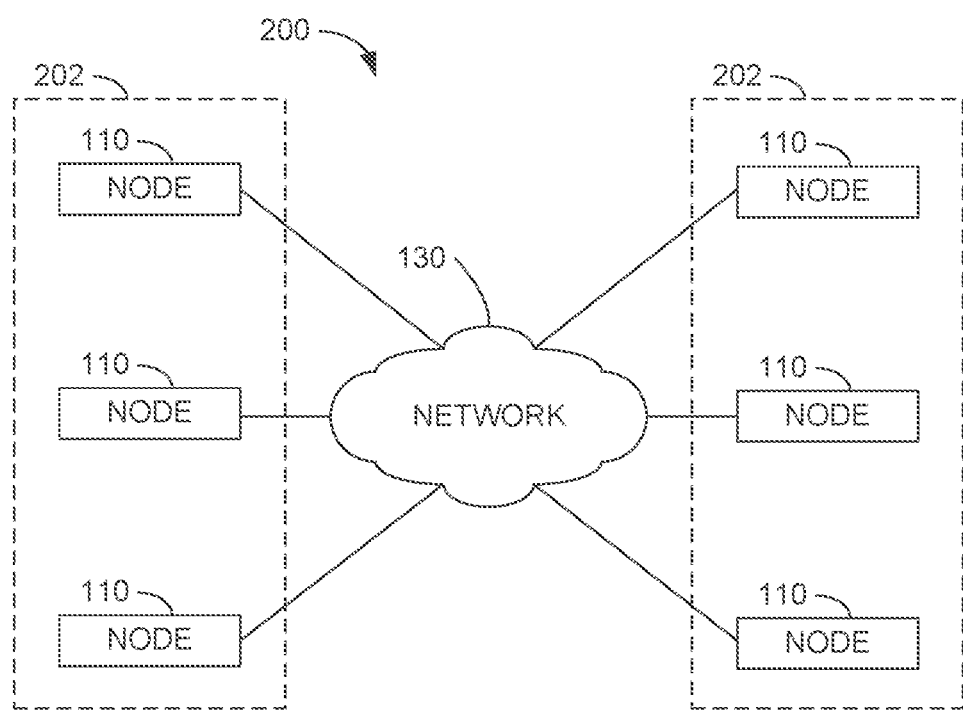
FIG. 2 is a block diagram of multiple example nodes employed in a plurality of geographic regions.

FIG. 2 is a block diagram of an example cloud system 200 in which multiple nodes 110 are employed to provide client systems 120 (not depicted in FIG. 2) access to application stacks 114. In addition, the various nodes 110 may be organized as separate cloud systems or subsystems according to geographic region 202 (e.g., according to state, country, continent, and so on). In an example embodiment, the nodes 110 may be organized in this manner based on differences in data privacy policies, governmental regulations, local business customs and practices, and the like between the various geographic regions 202.

Generally, while most cloud systems implement a variety of security measures (e.g., network firewalls, virus protection software, etc.), some malware threats may remain undetected. For example, a VM 112 may be adversely affected by malware, which in turn may negatively impact the state of the application stack 114 executing thereon. The affected application stack 114 may then allow unauthorized access to the database system 116 storing customer data.

In at least some example embodiments described below, malware threats and actions may be mitigated or prevented by employing copies of one or more distributed ledgers (e.g., blockchains) on the nodes 110 operating as a peer-to-peer network. For example, the nodes 110 may generate or construct transaction blocks that include information describing one or more requested data transactions. The blocks may further include access policy information (e.g., region-specific rules, regulations, and customs) and/or data provenance information regarding the requested data transactions. The blocks may then be published to other nodes 110, each of which may or may not choose to add the blocks to the distributed ledger. In an example embodiment, if a node 110 determines that any of the transactions of the block appear to be disallowable based on the access policy information, data provenance information, or other data, the node 110 may refuse to add the block to the distributed ledger. Based on a consensus of the nodes 110 operating on the distributed ledger, those transactions that are added to the distributed ledger may be allowed to proceed. Also in some example embodiments, this same consensus may be employed to determine whether some of the data transactions are indicative of one or more of the nodes 110 operating unreliably. Additionally, one or more of the nodes 1110 (e.g., an administrator node) may also control current or future access to the nodes 110 (e.g., deactivate a node 110, deny access to a node 110, or the like) based on the determination of node credibility or reliability.

In some example embodiments, the one or more distributed ledgers may also implement digital contracts (e.g., "smart" contracts) between users of the client devices 120 and the nodes 110 of the cloud system 100, as well as between nodes 110. The ledgers may be employed in the creation, maintenance, and retirement of the contracts, as well as in enforcing provisions of the contracts. Additionally, information regarding transactions undertaken via the contracts may also be employed in the determination of whether nodes 110 that are parties to the digital contracts are reliable.

Figure 3:
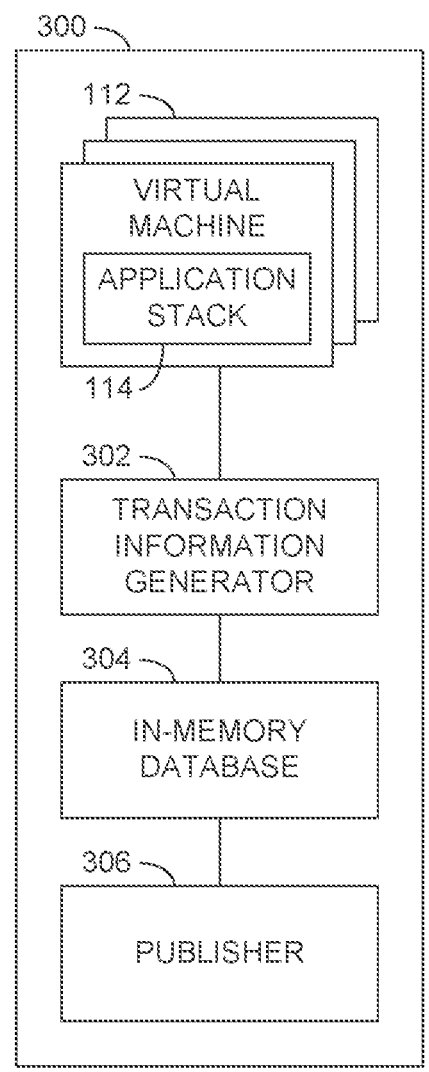
FIG. 3 is a block diagram of an example node.

FIG. 3 is a block diagram of an example embodiment of a node 300 that implements a distributed ledger. The node 300 may serve as an example of the node 110 of the cloud system 100. In example embodiments, the distributed ledger is embodied as a "blockchain," such as that employed in processing of Bitcoin transactions. However, other types of distributed ledgers may be employed in other example embodiments that employ various aspects of the example embodiments described in greater detail below.

As illustrated in FIG. 3, in addition to the VMs 112 and application stacks 114 mentioned above, the node 300 may include a transaction information generator 302, an in-memory database 304, and a publisher 306. In other example embodiments, and one or more of the transaction information generator 302, the in-memory database 304, and the publisher 306 may be located external to the node 300, such as within another system or server of the cloud system 100. In some example embodiments, other modules or components may be included in the node 300, but are not explicitly depicted in FIG. 3 to simplify and focus the foregoing discussion.

The transaction information generator 302, in an example embodiment, may capture and/or generate information involving requested data transactions involving the application stack 114, such as transactions involving the creation, modification, storage, and deletion of data (e.g., customer data). In example embodiments, this transaction information may include the identity of the owner or creator of the data, the identity of the application stack 114 and/or VM 112 involved in the data transaction, an indication of the data involved, the operations to be performed on the data, and so on. The transaction information may also include metadata that indicates or specifies any particular transaction rules/policies (e.g., region-based rules regarding data privacy, organizational rules regulating data. access, and so on). At least some of this information may be viewed as provenance data for the transaction, which may indicate a record of ownership or custody of the data involved in the transaction.

In some example embodiments in which the requested data transaction is governed by a digital contract, the transaction information may include programming code that automatically implements one or more provisions of the digital contract, such as payment for cloud services rendered. The transaction block generator 302 also may generate or capture other information relating to data transactions involving the application stacks 114 in sonic example embodiments. The transaction information generator 302 may then forward the generated transaction information to the in-memory database 304 for further processing.

The in-memory database 304 may receive the transaction information from the transaction information generator 302 described above, as well as from other nodes 110 (e.g., via the publisher 306). In addition, the in-memory database 304 may transmit the transaction information received from the transaction information generator 302 via the publisher 206 to the other nodes 110. In example embodiments, the in-memory database 304 (or a module associated therewith) may then determine which of the requested data transactions represented by the received transaction information are to be included in a transaction block for inclusion in the distributed ledger. In example embodiments, the in-memory database 304 may be used to determine that a particular requested transaction is allowable or disallowable based directly or indirectly on the access policy information and/or the data provenance information associated with each of the requested data transactions, as well as other information described below.

In example embodiments, the in-memory database 304 may also receive a current copy of the distributed ledger via the publisher 306, which may include transaction blocks recently added to the distributed ledger by other nodes 110. The in-memory database 304 (or a module associated therewith) may then add a transaction block including the transaction information noted above to its copy of the distributed ledger (e.g., by "mining" the transaction block by performing a "proof of work," such as generating one or more hashes based on the most recent block of the distributed ledger).

Similar to the operation of other types of blockchains or other types of distributed ledgers, the acceptance of each requested data transaction is determined by a consensus of the nodes 110 adding transaction blocks to the distributed ledger. Transactions that are not included in a block of the ledger may be deemed disallowable in some example embodiments.

In example embodiments, the in-memory database 304 may also store the data transaction information it receives in some form locally for processing to determine whether the node 300 or other nodes 110 are operating reliably, as is described in greater detail below. In an example embodiment, the in-memory database 304 may be an implementation of the SAP HANA® in-memory database. However, other types of in-memory databases, as well as other types of databases that are not implemented in-memory, may be employed in other example embodiments.

As indicated above, the publisher 306, in example embodiments, may be configured to publish and receive information regarding requested data transactions, as well as publish and receive copies of transaction blocks and/or the distributed ledger between the node 300 and other nodes 110. The publisher 306 may also store the information received from the other nodes 110 in the in-memory database 304 for further processing therein.

Figure 4:
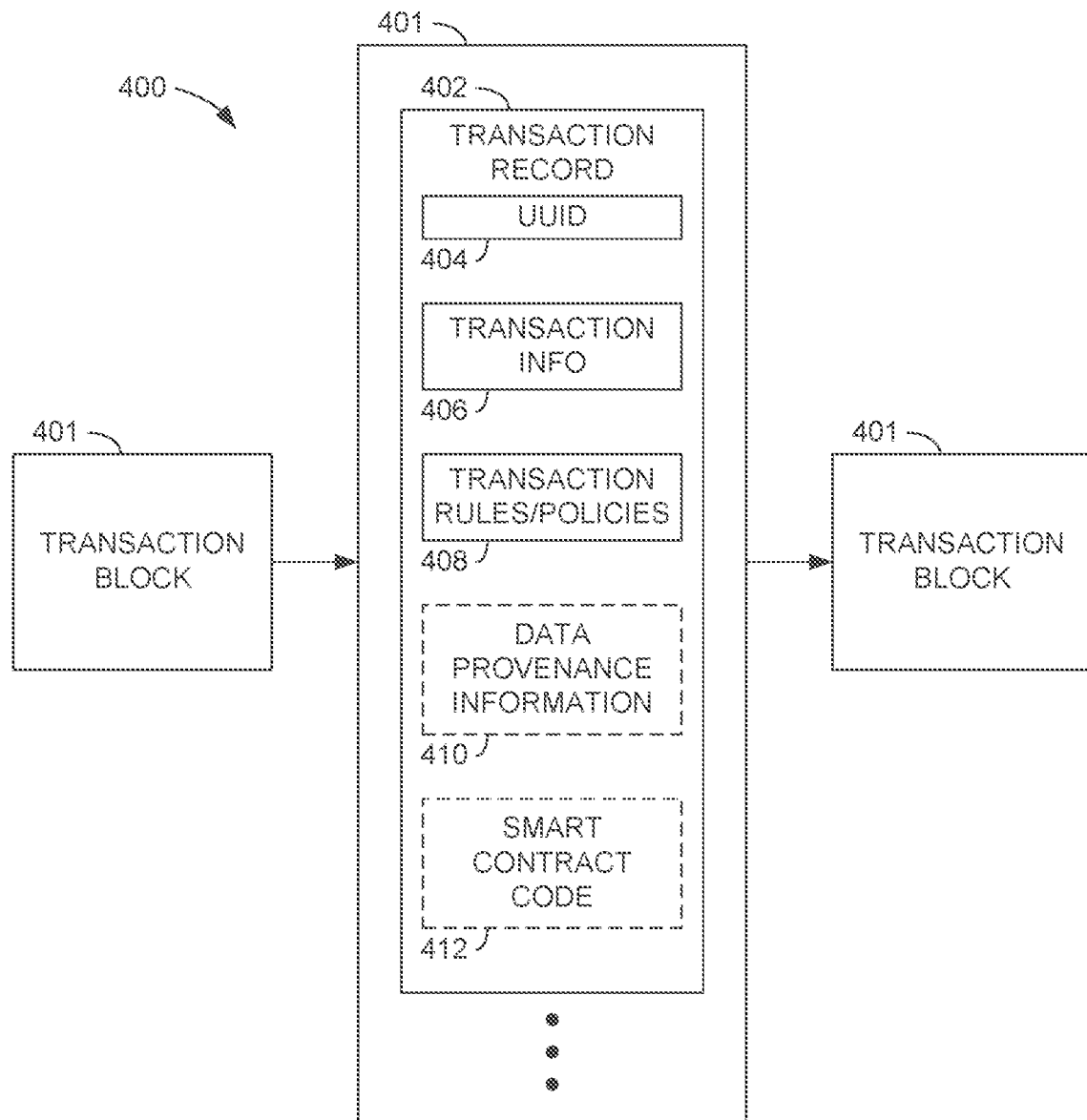
FIG. 4 is a block diagram of an example distributed ledger including transaction blocks containing one or more transaction records.

FIG. 4 is a block diagram of an example distributed ledger 400 including transaction blocks 401, each of which may contain one or more transaction records 402. As depicted in FIG. 4, a transaction record 401 may include one or more of a universally unique identifier 402, transaction information 406, transaction rules/policies 408, data provenance information 410, and smart contract code 412. In some example embodiments, a transaction record 402 may include data provenance information 410 or smart contract code 412, but not both. Also as illustrated in FIG. 4, each transaction block 401 is added or mined for inclusion in the distributed ledger (e.g., blockchain) in order, such as by way of performing a proof of work (e.g., a hash involving the previous transaction block 401 based on a predetermined nonce that conforms to one or more predetermined parameters). Other ways of generating the transaction blocks 401 and adding them to the distributed ledger 400 are possible in other example embodiments.

In an example embodiment, the UUID 402 identifies the requested data transaction corresponding to the transaction record 402, and may refer to a node 110 involved in the requested transaction. Example embodiments of the transaction information 406 are mentioned above. As discussed earlier, the transaction information 406 may include information describing the particular transaction, such as the creation, modification, storage, and deletion of data (e.g., customer data), and may include the identity of the owner or creator of the data, the identity of the application stack 114 and/or VM 112 involved in the requested data transaction, an indication of the data involved, the particular operations to be performed on the data, and so on.

The transaction rules/policies 408 data may include metadata that indicates or specifies any particular transaction rules/policies (e.g., region-based rules regarding data privacy, organizational rules regulating data access, and so on) applicable to this requested data transaction, as described above.

In some example embodiments, the data provenance information 410 may indicate a record of ownership or custody of the data involved in the requested transaction associated with the transaction record 402. The data provenance information 410 may include information indicating the original source of the data associated with the requested transaction, information indicating the data transactions that precede the currently requested data transaction, information indicating particular parties or systems that have had access to the data, and the like. In some example embodiments, the data provenance information 410 may be derived at least in part from transaction information 406 of transaction records 402 of prior transactions recorded in previous transaction blocks 401 of the distributed ledger 400.

The digital, or "smart," contract code 412 may include programming code that automatically implements one or more provisions of the digital contract, such as payment for cloud services rendered, wherein the digital contract governs the particular requested data transaction corresponding to the transaction record 402. In some example embodiments, the transaction record 402 may be associated with a transaction that involves an operation affecting the lifecycle of the contract itself, such as the creation, freezing, execution, finalization, and/or termination of the contract. In some example embodiments described in greater detail below, the system, by way of a consensus of the nodes 110, may determine whether such operations affecting the contract lifecycle are allowable.

In some example embodiments, the distributed ledger 400, when implemented as a blockchain, may be a public blockchain in which all nodes 110 may take part in building the blockchain and forming the consensus established thereby. In other example embodiments, the blockchain may be a consortium blockchain in which only preselected nodes 110 (e.g., nodes 110 selected by one or more cloud system 100 providers) may mine the blocks 401 for the blockchain 400, although all nodes 110 may retain the right to read the blockchain 400. Also, in other example embodiments, the blockchain 400 may be a private blockchain, whereby only nodes 110 of a particular cloud system 100 provider or other organization retain the write to mine the blocks 401, and read permissions made public or restricted as determined by that organization.

Figure 5:
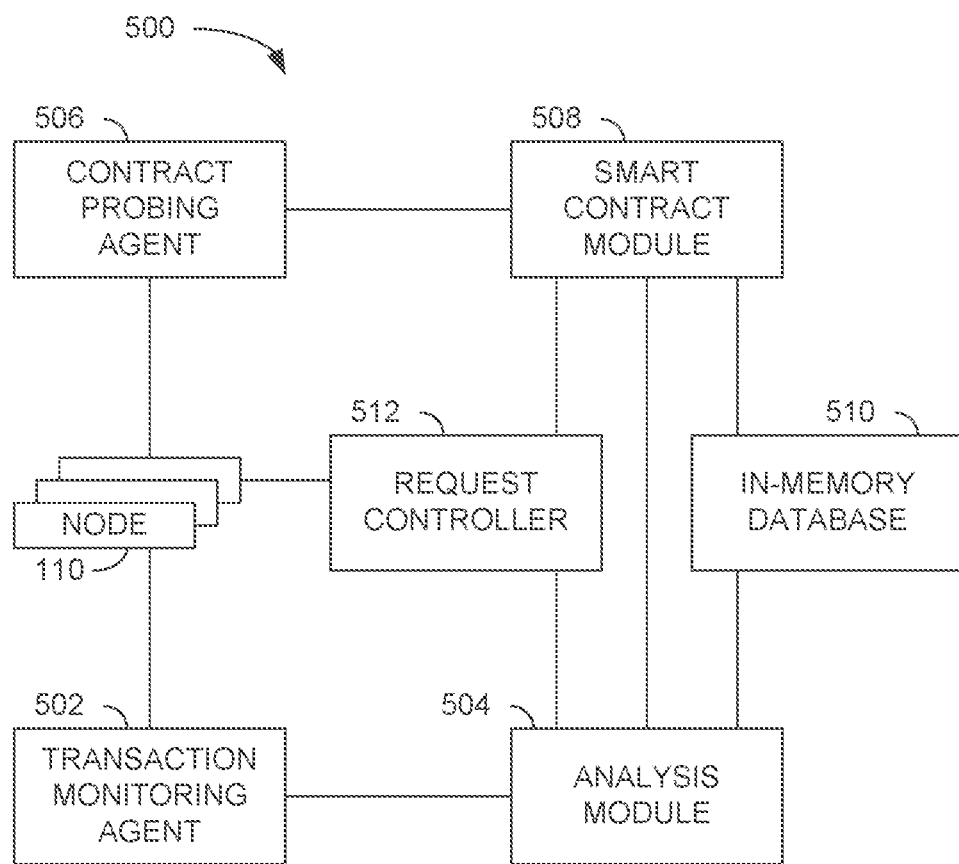
FIG. 5 is a block diagram of an example system architecture for controlling access and implementing digital contracts in a cloud system of nodes using a distributed ledger.

FIG. 5 is a block diagram of an example system 500 for controlling data access and implementing digital contracts in a cloud system (e.g., the cloud system 100 of FIG. 1) of nodes (e.g., nodes 110) using a distributed ledger (e.g., distributed ledger 400). The system 500, in an example embodiment, includes a transaction monitoring agent 502 and associated analysis module 504, a contract probing agent 506 and associated smart contract module 508, an in-memory database 510, and a request controller 512. In some example embodiments, several of the system components 502-512 may reside within one or more of the nodes 110, or within one or more other computing systems or servers, such as may be provided by the one or more cloud systems 100. Moreover, multiple instances of one or more of the system components 502-512 may be located within separate nodes 110 or other computing systems or servers in order to provide more communication and/or processing bandwidth for the system 500. While particular example embodiments are described below in view of FIG. 5, other methods or systems by which the functionality of the system 500 may be provided may be employed in other example embodiments. In some example embodiments, other modules or components may be included in the system 500, but are not explicitly depicted in FIG. 5 to simplify and focus the following discussion. Also, in some example embodiments, the system 500 may include greater or fewer numbers of modules, some modules may be combined, and/or some modules may be divided into greater numbers of modules.

The transaction monitoring agent 502, in an example embodiment, may be configured to capture or otherwise monitor data transaction requests, such as between a node 110 and a client system 120, between client systems 120, and so on. The transaction monitoring agent 506 may capture information associated with the data transaction request, such as the nodes 110 and/or client systems 120 involved in the transaction, the type of transaction (e.g., read, write, delete, and so on), an identification of the data involved (e.g., file names, database table identifiers, etc.), and so on. The transaction monitoring agent 502 may also capture or retrieve transaction metadata indicating transaction rules/policies (e.g., region-based rules regarding data privacy, organizational rules regulating data access, and so on) that are applicable to the requested transactions. In addition, the transaction monitoring agent 502 may also capture or retrieve data provenance information for the data involved in the requested transaction in sore example embodiments. The transaction monitoring agent 502 may forward the data transaction information and associated data noted above to the analysis module 504.

The analysis module 504, in example embodiments, may employ the data transaction information and associated data received from the transaction monitoring agent 502 to perform an analysis of the requested data transactions. In some example embodiments, the analysis module 504 may also monitor or collect direct and/or indirect cloud metrics (e.g., amounts and transfer speeds of data transferred in previous data transactions, the VMs 112 and application stacks 114 involved in those transactions, and so on), as well as generate assertion specifications based on those metrics. In some example embodiments, assertion specifications are predictions against which data transactions and other cloud operations may be compared to determine whether the transactions or other cloud operations represent authorized or unauthorized activity.

The analysis module 504 may then store at least some of the metrics and associated assertion specifications to the in-memory database 510, and employ the in-memory database 510 to perform calculations (e.g., on-the-fly, in real-time) to determine whether each of the requested data transactions is allowable. For each such requested transaction, such a decision may be based on a provenance score for that transaction (e.g., generated by the in.-memory database 510), which may be based on one or more factors, such as whether the requested transaction complies with any transaction rules/policies that apply to the transaction, whether the requested transaction is consistent with the provenance of the data involved in the transaction, whether an assertion specification would be violated by allowing the requested transaction, and so on. In an example embodiment, the data provenance scores may be based on a scale (e.g., 0 to 10).

Moreover, in some example embodiments, the in-memory database 510 may be configured to generate a credibility score for each of one or more nodes 110 based the data provenance scores mentioned above for those transaction involving the nodes 110. For example, poor data provenances scores of transactions involving a particular node 110 may result in a poor credibility score for that node 110. In an example embodiment, the credibility score for a particular node 110 may be an average, a weighted average based on a time at which the data transactions were requested, or some other calculation based on the data provenance scores for the data transactions involving that node 110. In an example embodiment, a node 110 credibility score may be based on a scale (e.g., 0 to 10). Further, a node 110 may not be considered credible or reliable unless the corresponding credibility score for that node 110 exceeds some predetermined threshold (e.g., 9 out of 10).

In an example embodiment, the contract probing agent 506 may be configured to capture or extract information regarding transactions that are either governed by a digital contract, as well as information regarding transactions that affect the lifecycle of a digital contract (e.g., create a new digital contract, terminate or modify an existing digital contract, and the like). Such information may include the parties involved (e.g., client system 120 and/or node 110), the terms of the contract (e.g., via smart contract code), the data covered by the contract, and so on. The contract probing agent 506 may also forward the captured or extracted information to the in-memory database 510 for storage, and/or interact with the smart contract module 508 regarding that information.

The smart contract module 508, in an example embodiment, may analyze the requests involving one or more digital contracts based on the transaction information provided by the contract probing agent 506. In an example embodiment, the smart contract module 508 may generate information to be stored in the in-memory database 510 that may be utilized to determine whether a particular data transaction request should be approved or disapproved based on a comparison of the requested transaction to the digital contract. The smart contract module 508 may further base such a determination on other information accessible via the in-memory database 510, such as a provenance score for the data involved in the requested transaction, or a credibility score for a node 110 involved in the requested transaction. In some example embodiments, the smart contract module 508 may consider some data transaction requests that violate the digital contract in some way, but do not involve a poor provenance score (or poor credibility score for a node 110 involved in the requested transaction), as being allowable.

Also in example embodiments, the smart contract module 508 may be configured to generate information determinative as to whether data transaction requests that affect the lifecycle of a digital contract (e.g., create a new digital contract, terminate or modify an existing digital contract, and the like) are allowable. Such information, for example, may be based on data provenance information generated by the analysis module 504 and stored in the in-memory database 510.

The in-memory database 510, in an example embodiment, may employ the data generated by the analysis module 504 and/or the smart contract module 508 to determine which of the requested data transactions may be allowable. Such information may include, for example, the data provenance scores and/or the node 110 credibility scores described above. In an example embodiment, the in-memory database 510 may be an example embodiment of the in-memory database 304 of FIG. 3 discussed earlier. Consequently, the in-memory database 510, based on the information stored therein, may mine one or more transaction blocks 401 to the blockchain 400 reflecting the requested transactions (e.g. via transaction records 402 included therein) that the in-memory database 510 has concluded are allowable. In some example embodiments, the use of the in-memory database 510 may reduce the response time of the system 500 in determining the allowability of the data transaction requests compared to that of a standard database system.

In an example embodiment, the request controller 512 may be configured to allow or deny data transaction requests based on the consensus of the various nodes 110 contributing to the blockchain 400 or distributed ledger. For example, the request controller 512 may determine that the transactions represented by the transaction records 402 that have been mined and accepted permanently into the blockchain 400 or distributed ledger by some plurality of nodes 110 should be allowed, while others not mined and accepted into the distributed ledger are to be denied. In an example embodiment, a particular request controller 512 may be responsible for allowing or deny transactions involving particular nodes 110 with which the request controller 512 is associated, such as those nodes 110 within a particular geographic region 202 associated with the request controller 512.

In example embodiments, one or more instances of the request controller 512, as well as one or more of the other components 502-510, may be employed in one or more of the nodes 110. In some example embodiments, nodes 110 that employ the request controller 512 may be selected (e.g., by an operator of the cloud system 100) as an arbitrator node to perform these functions. Additionally, in some example embodiments, each of the components 502-510 employed in different nodes 110 or arbitrator nodes may operate in a different way (e.g., employ different calculations) in generating the data upon which the request controller 512 depends to control access to the various nodes 110 (e.g., the data provenance scores and/or the node credibility scores). Also, the various system components 502-512, including the request controller 512, may operate on a group of nodes 110 located within a particular geographic region 202, or even on nodes 110 of two or more separate geographic regions 202.

Figure 6:
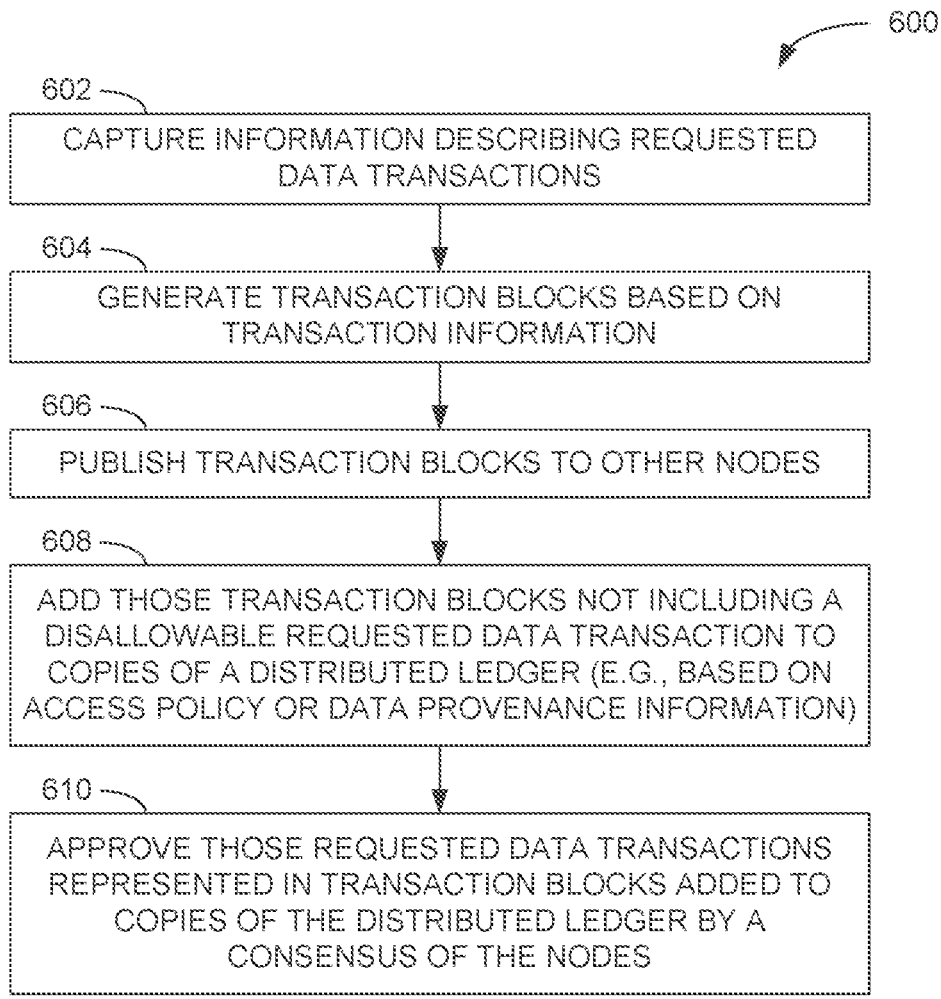
FIG. 6 is a flow diagram of an example method of controlling access to nodes of a cloud system using a distributed ledger.

FIG. 6 is a flow diagram of an example method 600 of controlling access to nodes 110 of a cloud system 100 using a distributed ledger (e.g. blockchain 400). While the method 600, as well as other methods described herein, is presented as being performed by the node 300 of FIG. 3 and/or the system 500 of FIG. 5, systems or devices other than those specifically described above may perform these methods in other example embodiments.

In the method 600, information describing requested data transactions is captured (operation 602) (e.g., via the transaction information generator 302). Transaction blocks 401 including the transaction information (e.g., in transaction records 401) are generated for those requested transactions considered to be allowable (e.g., by the in-memory database 304) (operation 604). The transaction blocks 401 may then be published to other nodes 110 (operation 606) (e.g., by the publisher 306) for possible inclusion in remote copies of the blockchain 400.

Similarly, in example embodiments, the in-memory database 304 may receive transaction information from other nodes 110 for generating or mining transaction blocks 401, as well as receiving transaction blocks 401 from other nodes 110 for inclusion in a distributed (e.g., local copy) of the blockchain 400. At each of the nodes 110, those transaction blocks 401 not including a transaction record 401 for a requested data transaction that is to be denied (e.g., as determined by the in-memory database 304 of each of the nodes 110) may then be added to the blockchain 400 (operation 608). Such a determination may be based on one or more factors, such as a data provenance of the data involved in the transaction (e.g., a provenance score), a level of credibility (e.g., a credibility score) associated with a node 110 involved in the transaction, and so on, as described above. Based on a consensus of the nodes 110 operating on the blockchain 400, the requested transactions represented in the transaction blocks 401 added to copies of the blockchain 401 may then be approved (operation 610) (e.g., via the request controller 512).

In the method 600 of FIG. 6, while a particular order of execution is shown for the operations 602-610, other orders of execution are also possible, including possible simultaneous, concurrent, or overlapping execution of two or more of the operations 602-610. For example, as transactions involving the various nodes 110 are requested, the various nodes 110 contributing to the blockchain 400 may continually or repetitively perform the various operations 602-610.

Figure 7:
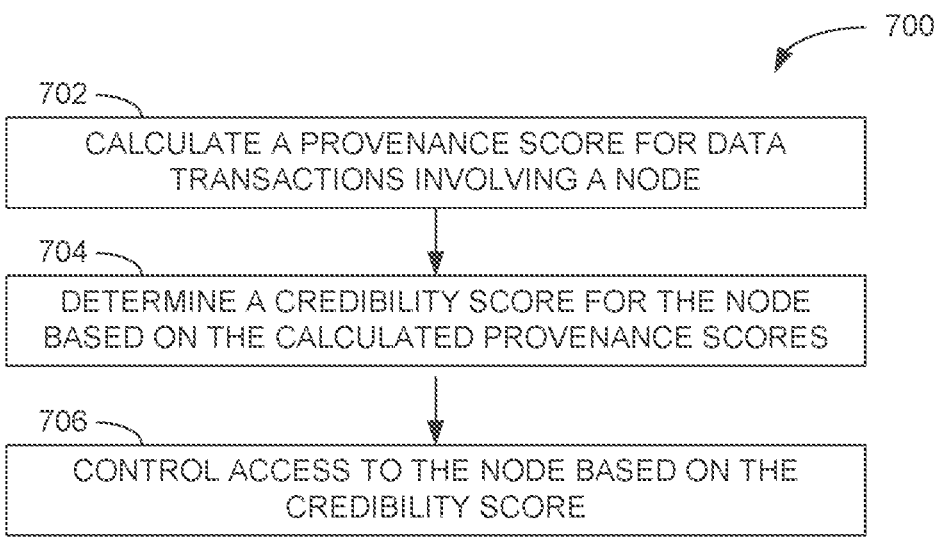
FIG. 7 is a flow diagram of an example method of determining a level of credibility of a node for controlling access to the node.

FIG. 7 is a flow diagram of an example method 700 of determining a level of credibility of a node 110 for controlling access to the node 110. In the method 700, a provenance score for each of a number of data transactions involving the node 110 may be calculated (operation 702) (e.g., by the in-memory database 510). The provenance scores may be based on, for example, information regarding previous and current requested data transactions (e.g., using data access rules/policies, data provenance information, etc.) Based on the calculated provenance scores, a credibility score for a node 110 involved in those data transactions may be calculated (operation 704) (e.g., by the in-memory database 510). Access to the node 110 (e.g., by way of approving or denying requested data transactions to the node by way of a consensus of multiple nodes 110) may be controlled based on the credibility score of the node 110 (operation 706) (e.g., by the request controller 512 based on the distributed ledger or blockchain 400 generated in view of the credibility scores of the various nodes 110).

Figure 8:
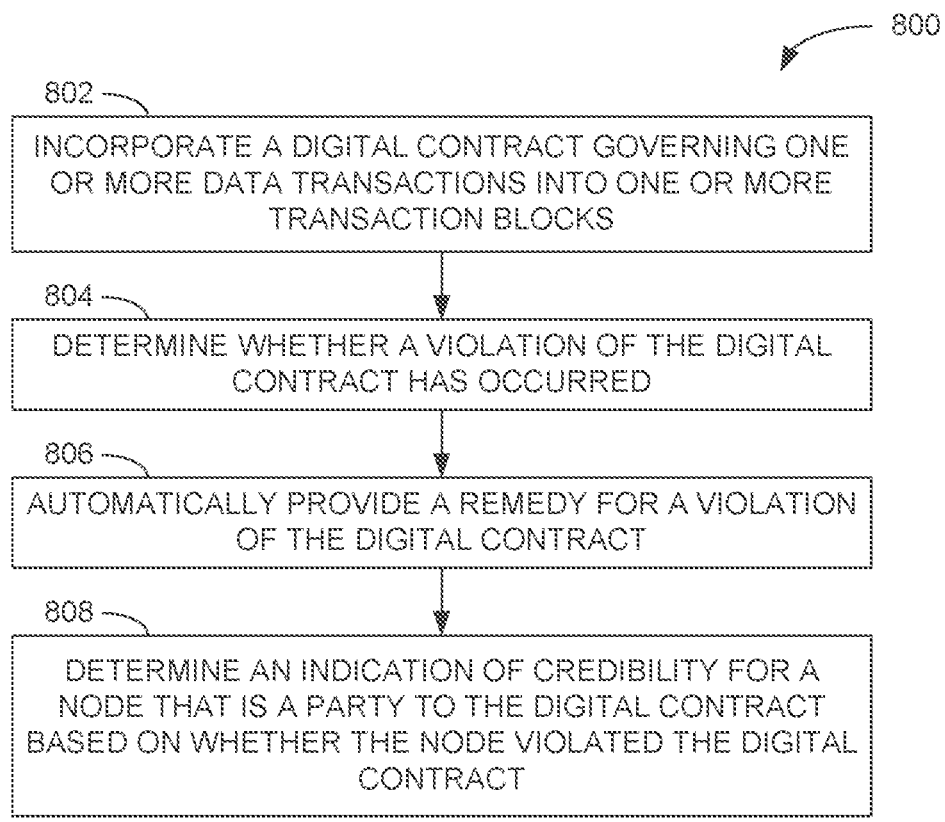
FIG. 8 is a flow diagram of an example method of implementing digital contracts in a cloud system using a distributed ledger.

FIG. 8 is a flow diagram of an example method 800 of implementing digital contracts in a cloud system using a distributed ledger. In the method 800, a digital contract governing one or more requested data transactions may be incorporated into one or more transaction blocks 401 of a blockchain 400 (operation 802) (e.g., by one or more nodes 110, as indicated above). A determination may be made as to whether a violation of the digital contract has occurred by way of the requested data transaction (operation 804) (e.g., by the request controller 512). Based on a determination that a violation has occurred, a remedy for the violation may be automatically provided (operation 806) (e.g., by an execution of programming code for the digital contract provided in the blockchain 400, such as by the request controller 512). In addition, an indication of credibility (e.g., a credibility score) for a node 110 that is a party to the digital contract may be determined based on whether the node 110 violated the digital contract (operation 808) (e.g., by the in-memory database 510).

In other example embodiments in which requested data transactions involving a node 110 affect the lifecycle (e.g., creation, modification, termination, and the like) of a digital contract may also be controlled (e.g., allowed or denied) (e.g., by the request controller 512 using a credibility score of the node 110).

In an example embodiment, an access control system comprises one or more hardware processors and one or more memories storing instructions that, when executed by at least one of the one or more hardware processors, cause the access control system to perform operations comprising capturing, by a plurality of nodes of a computer network, information describing requested data transactions in the computer network; constructing, by at least some of the plurality of nodes, transaction blocks for a distributed ledger, each of the transaction blocks comprising information describing one or more of the requested data transactions; publishing, by the at least some of the plurality of nodes, the transaction blocks to others of the plurality of nodes; adding, by the plurality of nodes receiving the transaction blocks, those of the transaction blocks not including a disallowable requested data transaction to copies of the distributed ledger; and approving, by one or more arbitrator nodes of the plurality of nodes, those of the requested data transactions represented in transaction blocks added to the copies of the distributed ledger by a consensus of the plurality of nodes.

In an example embodiment, a method for controlling system access comprises capturing, by a plurality of nodes of a computer network, information describing requested data transactions in the computer network, constructing, by at least some of the plurality of nodes, transaction blocks for a distributed ledger, each of the transaction blocks comprising information describing one or more of the requested data transactions; publishing, by the at least some of the plurality of nodes, the transaction blocks to others of the plurality of nodes; adding, by the plurality of nodes receiving the transaction blocks, those of the transaction blocks not including a disallowable requested data transaction to copies of the distributed ledger; and approving, by one or more arbitrator nodes of the plurality of nodes, those of the requested data transactions represented in transaction blocks added to the copies of the distributed ledger by a consensus of the plurality of nodes.

In another example embodiment, including all previous example embodiments, each of the transaction blocks further comprises data provenance information associated with the one or more of the requested data transactions, and the adding of those of the requested transaction blocks is based on the data provenance information.

In another example embodiment, including all previous example embodiments, the method further comprises determining an indication of credibility of a first node of the plurality of nodes based on the data provenance information; and controlling, by one of the one or more arbitrator nodes, access to data by the first node based on the indication of credibility.

In another example embodiment, including all previous example embodiments, the controlling of access to data by the first node comprises isolating the first node from the computer network.

In another example embodiment, including all previous example embodiments, the determining of the indication of credibility of the first node is based on data provenance information associated with data transactions involving the first node.

In another example embodiment, including all previous example embodiments, the determining of the indication of credibility comprises performing calculations using an in-memory database in real-time.

In another example embodiment, including all previous example embodiments, the determining of the indication of credibility comprises comparing a credibility score of the first node to a threshold, wherein the credibility score is produced by the calculations.

In another example embodiment, including all previous example embodiments, the method further comprises incorporating a digital contract into the distributed ledger.

In another example embodiment, including all previous example embodiments, wherein the digital contract governs at least some of the requested data transactions.

In another example embodiment, including all previous example embodiments, the determining of the indication of credibility of the first node is further based on the at least some of the requested data transactions as governed by the digital contract.

In another example embodiment, including all previous example embodiments, the digital contract governs data transactions between the first node and a client system; and the method further comprises determining whether the first node has violated the digital contract; and automatically compensating, by the one or more arbitrator nodes, the client device based on a determination that the first node has violated the digital contract.

In another example embodiment, including all previous example embodiments, the digital contract governs data transactions between the first node and a client system; and the method further comprises determining whether the client device has violated the digital contract; and automatically penalizing, by the one or more arbitrator nodes, the client device based on a determination that the client device has violated the digital contract.

In another example embodiment, including all previous example embodiments, each of the transaction blocks further comprises access policy information associated with the one or more of the requested data transactions; and the adding of those of the requested transaction blocks is based on the access policy information.

In another example embodiment, including all previous example embodiments, the plurality of nodes comprises a first plurality of nodes associated with a first geographical region; first access policy information applies to the first geographical region; the first plurality of nodes includes the first node; and the adding of those of the requested transaction blocks involving the first node is based on the first access policy information.

In another example embodiment, including all previous example embodiments, the plurality of nodes comprises a second plurality of nodes associated with a second geographical region different from the first geographical region; second access policy information applies to the second geographical region; and the adding of those of the requested transaction blocks involving the first node is performed by a plurality of the second plurality of nodes.

In another example embodiment, including all previous example embodiments, a plurality of nodes comprises a first plurality of nodes provided by a first cloud system provider and a second plurality of nodes provided by a second cloud system provider different from the first cloud system provider; and the adding of those of the transaction blocks is performed by nodes of both the first plurality of nodes and the second plurality of nodes.

In another example embodiment, including all previous example embodiments, at least one copy of the distributed ledger is stored in an in-memory database of one of the plurality of nodes.

In another example embodiment, including all previous example embodiments, each of the transaction blocks comprises a universally unique identifier for a node involved in each of the one or more of the requested data transactions.

In an example embodiment, a non-transitory computer-readable storage medium stores instructions that, when executed by one or more processors of an access control system, cause the access control system to perform operations comprising capturing, by a plurality of nodes of a computer network, information describing requested data transactions in the computer network; constructing, by at least some of the plurality of nodes, transaction blocks for a distributed ledger, each of the transaction blocks comprising information describing one or more of the requested data transactions; publishing, by the at least some of the plurality of nodes, the transaction blocks to others of the plurality of nodes; adding, by the plurality of nodes receiving the transaction blocks, those of the transaction blocks not including a disallowable requested data transaction to copies of the distributed ledger; and approving, by one or more arbitrator nodes of the plurality of nodes, those of the requested data transactions represented in transaction blocks added to the copies of the distributed ledger by a consensus of the plurality of nodes.

Figure 9:
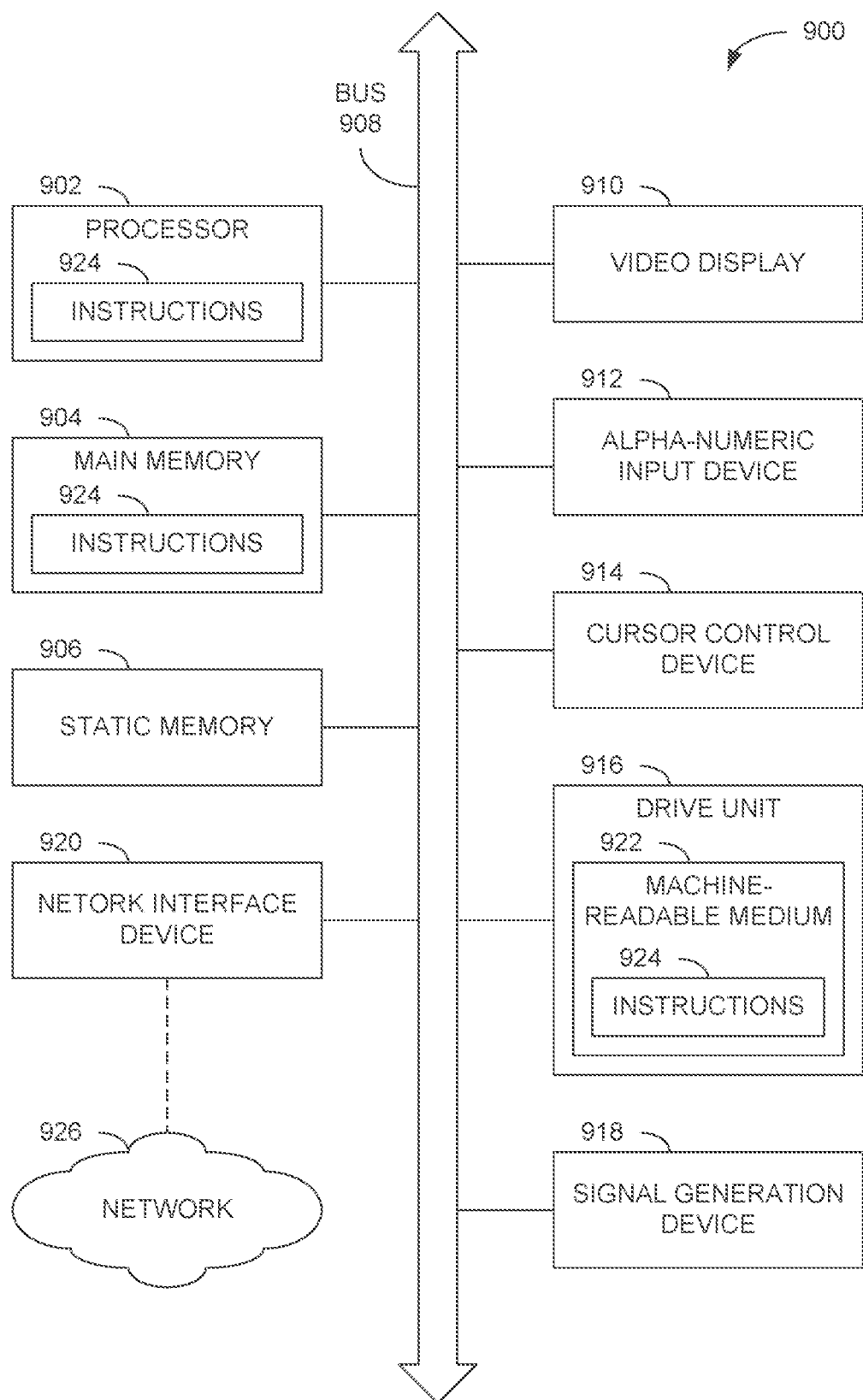
FIG. 9 is a block diagram of a computer processing system within which a set of instructions may be executed for causing a computer to perform any one or more of the methodologies discussed herein.

FIG. 9 is a block diagram of a computer processing system 900 within which a set of instructions 924 may be executed for causing a computer to perform any one or more of the methodologies discussed herein, such as those discussed in conjunction with FIG. 4, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 900 may serve in example embodiments as, for example, the user interface system 102 of FIGS. 1 and 2, as well as any component or module described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 900 includes a processor 902 (e.g., a central processing unit (CPU), a graphics processing unit (GPU), or both), a main memory 904, and a static memory 906, which communicate with each other via a bus 908. The computer processing system 900 may further include a video display 910 (e.g., a plasma display, a liquid crystal display (LCD), or a cathode ray tube (CRT)). The computer processing system 900 also includes an alphanumeric input device 912 (e.g., a keyboard), a user interface (UI) cursor control device 914 (e.g., a mouse and/or touch screen), a drive unit 916, a signal generation device 918 (e.g., a speaker), and a network interface device 920.

The drive unit 916 includes a machine-readable medium 922 on which is stored one or more sets of instructions 924 and data structures embodying or utilized by any one or more of the methodologies or functions described herein. The instructions 924 may also reside, completely or at least partially, within the main memory 904, the static memory 906, and/or the processor 902 during execution thereof by the computer processing system 900, with the main memory 904, the static memory 906, and the processor 902 also constituting tangible machine-readable media 922.

The instructions 924 may further be transmitted or received over a network 926 via the network interface device 920 utilizing any one of a number of well-known transfer protocols (e.g., Hypertext Transfer Protocol).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions 924 for execution by the computer and that cause the computer to perform any one or more of the methodologies of the present application, or that is capable of storing, encoding, or carrying data structures utilized by or associated with such a set of instructions 924. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. An access control system comprising:
one or more hardware processors; and
one or more memories storing instructions that, when executed by at least one of the one or more hardware processors, cause the access control system to perform operations comprising:
capturing, by a plurality of nodes of a computer network, information describing requested data transactions in the computer network, the requested data transactions pertaining to at least one of creation, modification, storage, or deletion of customer data;
constructing, by at least some of the plurality of nodes, transaction blocks for a distributed ledger, each of the transaction blocks comprising information describing one or more of the requested data transactions;
publishing, by the at least some of the plurality of nodes, the transaction blocks to others of the plurality of nodes;
adding, by the plurality of nodes receiving the transaction blocks, those of the transaction blocks not including a disallowable requested data transaction to copies of the distributed ledger;
approving, by one or more arbitrator nodes of the plurality of nodes, those of the requested data transactions represented in transaction blocks added to the copies of the distributed ledger by a consensus of the plurality of nodes, the arbitrator nodes being a subset of the plurality of nodes, the arbitrator nodes selected based on each of the arbitrator nodes being associated with a request controller;
determining an indication of a credibility of a first node of the plurality of nodes, wherein the determining of the indication of credibility comprises comparing a credibility score of the first node to a threshold; and
controlling, by the request controller associated with the one or more arbitrator nodes, access to data by the first node based on the indication of credibility, the controlling of the access including approving or denying requested data transactions to the first node.

2. A method of controlling system access, the method comprising:
capturing, by a plurality of nodes of a computer network, information describing requested data transactions in the computer network, the requested data transactions pertaining to at least one of creation, modification, storage, or deletion of customer data;
constructing, by at least some of the plurality of nodes, transaction blocks for a distributed ledger, each of the transaction blocks comprising information describing one or more of the requested data transactions;
publishing, by the at least some of the plurality of nodes, the transaction blocks to others of the plurality of nodes;
adding, by the plurality of nodes receiving the transaction blocks, those of the transaction blocks not including a disallowable requested data transaction to copies of the distributed ledger;
approving, by one or more arbitrator nodes of the plurality of nodes, those of the requested data transactions represented in transaction blocks added to the copies of the distributed ledger by a consensus of the plurality of nodes, the arbitrator nodes being a subset of the plurality of nodes, the arbitrator nodes selected based on each of the arbitrator nodes being associated with a request controller;

determining an indication of a credibility of a first node of the plurality of nodes, wherein the determining of the indication of credibility comprises comparing a credibility score of the first node to a threshold; and controlling, by the request controller associated with the one or more arbitrator nodes, access to data by the first node based on the indication of credibility, the controlling of the access including approving or denying requested data transactions to the first node.

3. The method of claim 2, wherein each of the transaction blocks further comprises data provenance information associated with the one or more of the requested data transactions, and the adding of those of the requested transaction blocks is based on the data provenance information.

4. The method of claim 3, wherein the determining of the indication of the credibility of the first node of the plurality of nodes is based on the data provenance information.

5. The method of claim 2, wherein the controlling of access to data by the first node comprises isolating the first node from the computer network.

6. The method of claim 2, wherein the determining of the indication of credibility of the first node is based on data provenance information associated with data transactions involving the first node.

7. The method of claim 2, wherein the determining of the indication of credibility comprises performing calculations using an in-memory database in real-time.

8. The method of claim 7, wherein the credibility score is produced by the calculations.

9. The method of claim 2, further comprising:
incorporating a digital contract into the distributed ledger.

10. The method of claim 9, wherein the digital contract governs at least some of the requested data transactions.

11. The method of claim 4, wherein the determining of the indication of credibility of the first node is further based on the at least some of the requested data transactions as governed by the digital contract.

12. The method of claim 10, wherein:
the digital contract governs data transactions between the first node and a client system; and the method further comprises:
determining whether the first node has violated the digital contract; and
automatically compensating, by the one or more arbitrator nodes, the client device based on a determination that the first node has violated the digital contract.

13. The method of claim 10, wherein:
the digital contract governs data transactions between the first node and a client system; and
the method further comprises:
determining whether the client device has violated the digital contract; and
automatically penalizing, by the one or more arbitrator nodes, the client device based on a determination that the client device has violated the digital contract.

14. The method of claim 2, wherein:
each of the transaction blocks further comprises access policy information associated with the one or more of the requested data transactions; and
the adding of those of the requested transaction blocks is based on the access policy information.

15. The method of claim 14, wherein:
the plurality of nodes comprises a first plurality of nodes associated with a first geographical region;
first access policy information applies to the first geographical region;
the first plurality of nodes includes the first node; and
the adding of those of the requested transaction blocks involving the first node is based on the first access policy information.

16. The method of claim 15, wherein:
the plurality of nodes comprises a second plurality of nodes associated with a second geographical region different from the first geographical region;
second access policy information applies to the second geographical region; and
the adding of those of the requested transaction blocks involving the first node is performed by a plurality of the second plurality of nodes.

17. The method of claim 2, wherein:
a plurality of nodes comprises a first plurality of nodes provided by a first cloud system provider and a second plurality of nodes provided by a second cloud system provider different from the first cloud system provider; and
the adding of those of the transaction blocks is performed by nodes of both the first plurality of nodes and the second plurality of nodes.

18. The method of claim 2, wherein at least one copy of the distributed ledger is stored in an in-memory database of one of the plurality of nodes.

19. The method of claim 2, wherein each of the transaction blocks comprises a universally unique identifier for a node involved in each of the one or more of the requested data transactions.

20. A non-transitory computer-readable storage medium storing instructions that, when executed by one or more processors of an access control system, cause the access control system to perform operations comprising:
capturing, by a plurality of nodes of a computer network, information describing requested data transactions in the computer network, the requested data transactions pertaining to at least one of creation, modification, storage, or deletion of customer data;
constructing, by at least some of the plurality of nodes, transaction blocks for a distributed ledger, each of the transaction blocks comprising information describing one or more of the requested data transactions;
publishing, by the at least some of the plurality of nodes, the transaction blocks to others of the plurality of nodes;
adding, by the plurality of nodes receiving the transaction blocks, those of the transaction blocks not including a disallowable requested data transaction to copies of the distributed ledger;
approving, by one or more arbitrator nodes of the plurality of nodes, those of the requested data transactions represented in transaction blocks added to the copies of the distributed ledger by a consensus of the plurality of nodes, the arbitrator nodes being a subset of the plurality of nodes, the arbitrator nodes selected based on each of the arbitrator nodes being associated with a request controller;
determining an indication of a credibility of a first node of the plurality of nodes, wherein the determining of the indication of credibility comprises comparing a credibility score of the first node to a threshold; and controlling, by the request controller associated with the one or more arbitrator nodes, access to data by the first node based on the indication of credibility, the controlling of the access including approving or denying requested data transactions to the first node.

* * * * *